(No Model.)
J. L. ROBERTSON.
EXHAUST HEAD.
No. 481,373. Patented Aug. 23, 1892.
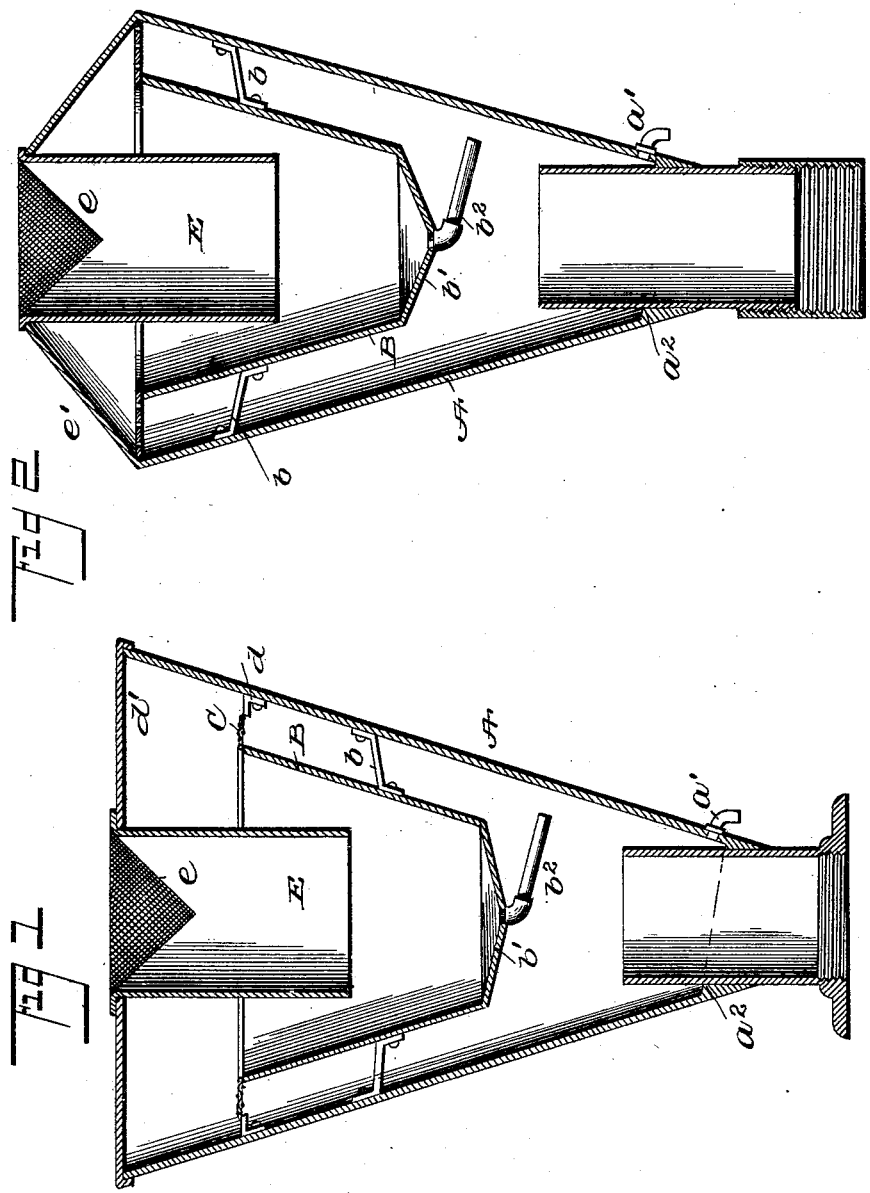
Witnesses
Inventor
James L. Robertson,
By his Attorney

UNITED STATES PATENT OFFICE.

JAMES L. ROBERTSON, OF NEW YORK, N. Y.

EXHAUST-HEAD.

SPECIFICATION forming part of Letters Patent No. 481,373, dated August 23, 1892.

Application filed April 23, 1892. Serial No. 430,412. (No model.)

*To all whom it may concern:*

Be it known that I, JAMES L. ROBERTSON, of New York, in the county of New York and State of New York, have invented certain new and useful Improvements in Exhaust-Heads; and I do hereby declare the following to be a full, clear, and exact description of the invention, such as will enable others skilled in the art to which it appertains to make and use the same.

This invention relates to certain new and useful improvements in steam exhaust heads or mufflers; and it has for its object the production of an exhaust-head which shall possess advantages in point of simplicity, durability, and inexpensiveness, and which will completely and effectively separate the water from the steam in the passage of the latter through the exhaust-head.

The invention comprises an exhaust-head having an outer casing, an inner casing secured thereto, a foraminous plate or wire screen in the passage-way between said outer and inner casings, and an outlet-pipe depending from said outer casing and extending down into said inner casing and having its outer end covered by a foraminous plate or screen, substantially as hereinafter fully set forth, and particularly pointed out in the claims.

In the accompanying drawings, Figure 1 is a vertical longitudinal sectional view of my improved exhaust-head. Fig. 2 is a similar view of a slightly-modified form thereof.

Referring to the drawings, A designates an outer casing of approximately inverted-cone shape, and $a$ an outlet-pipe opening into the lower end thereof, said pipe being connected by a coupling of any preferred form to the steam-pipe. (Not shown.) An outlet-tube $a'$ is attached to the outer casing A, adjacent to the lower end thereof. This end of the casing is thickened or provided with an inner flange $a^2$, which is inclined, as shown, so as to direct the accumulated water toward the outlet-tube.

B is an inner casing, which at about its center is rigidly secured to the outer casing by arms or brackets $b$. This casing conforms in shape to but is smaller than that portion of the outer casing contiguous thereto. From the lower trough-like end $b'$ of casing B extends a pipe $b^2$, the outer end of which is adjacent to the inner side of casing A.

C is a foraminous plate or screen located in the line of passage of the steam from the outer to the inner casings and at right angles to said passage. This plate or screen is attached at its inner edge to the upper edge of the inner casing, and at its outer edge it is supported by cleats or flanged plates $d$, rigidly secured to the outer casing.

From the cover $d'$ of casing A depends an outlet-pipe E, which extends down into the inner casing to a point about midway the length thereof. In the upper end of this outlet-pipe is a cone-shaped foraminous plate or screen $e$, the edge of which is secured to cover $d'$ around the upper end of said outlet-pipe.

In Fig. 2 I have shown a slightly-modified form of my invention, the same consisting in making the outer casing of dome shape by extending cover $e'$ upwardly on an incline. This form enables me to minimize space and yet secure equally advantageous results.

From what has been said it will be seen that the steam upon entering the outer casing at the lower end thereof will travel upwardly and pass through the foraminous plate or screen C and then down into the inner chamber and up into the outlet-pipe and out through the cone-shaped plate or screen in the upper end of said outlet-pipe. In this passage of the steam all water will be removed therefrom, especially by reason of the contact of the steam with the foraminous plates or screens, and will fall to the bottom of the outer casing, where it will pass off through the outlet-tube. The inclination of the outer casing at its lower end will prevent water from accumulating at this point, and thus avoid freezing, which results in the breakage of the casing.

The advantages of my invention are apparent to those skilled in the art to which it appertains. It will be especially observed that an exhaust-head constructed as described is extremely simple and inexpensive and that by placing the foraminous plates or screens at right angles to the line of passage of the steam the separation of the water therefrom is readily and thoroughly accomplished, and this adds but slight cost to the head and dispenses with the necessity of forming circuitous or spiral passage-ways for the steam.

I claim as my invention—

1. The herein-described improved exhaust-head, comprising the outer casing having the lower inlet and upper outlet pipes, the inner casing located within and secured to said outer casing, forming a passage-way between itself and said outer casing, and the foraminous plate or screen located in said passage-way at right angles to the line of passage of the steam, substantially as set forth.

2. The herein-described improved exhaust-head, comprising the outer casing having the lower inlet-pipe, the inner casing located within and secured to said outer casing, the foraminous plate or screen located in the passage-way between said outer and inner casings and at right angles to the passage of the steam, and the outlet-pipe depending from the top of said outer casing down into said inner casing and having a foraminous plate or screen located therein, substantially as set forth.

3. The herein-described improved exhaust-head, comprising the outer casing, the inner casing located within said outer casing, the arms supporting the same, the foraminous plate or screen secured to the upper end of said inner casing and also to said outer casing, the outlet-pipe depending from the top of said outer casing down into said inner casing, and the cone-shaped foraminous plate or screen secured to the upper end of said outlet-pipe, substantially as set forth.

4. An exhaust-head having its outer casing provided with a beveled or inclined inner flange or lower thickened end and the outlet-tube extending from said casing at the lowest point of said flange or thickened end, in combination with the inner casing and the inlet and outlet pipes, substantially as set forth.

In testimony whereof I have signed this specification in the presence of two subscribing witnesses.

JAMES L. ROBERTSON.

Witnesses:
WM. B. MCNIECE,
WM. S. HODGES.